May 28, 1929.  W. E. WOODARD  1,714,581
SIX-WHEEL TRUCK
Filed Feb. 14, 1925   3 Sheets-Sheet 2
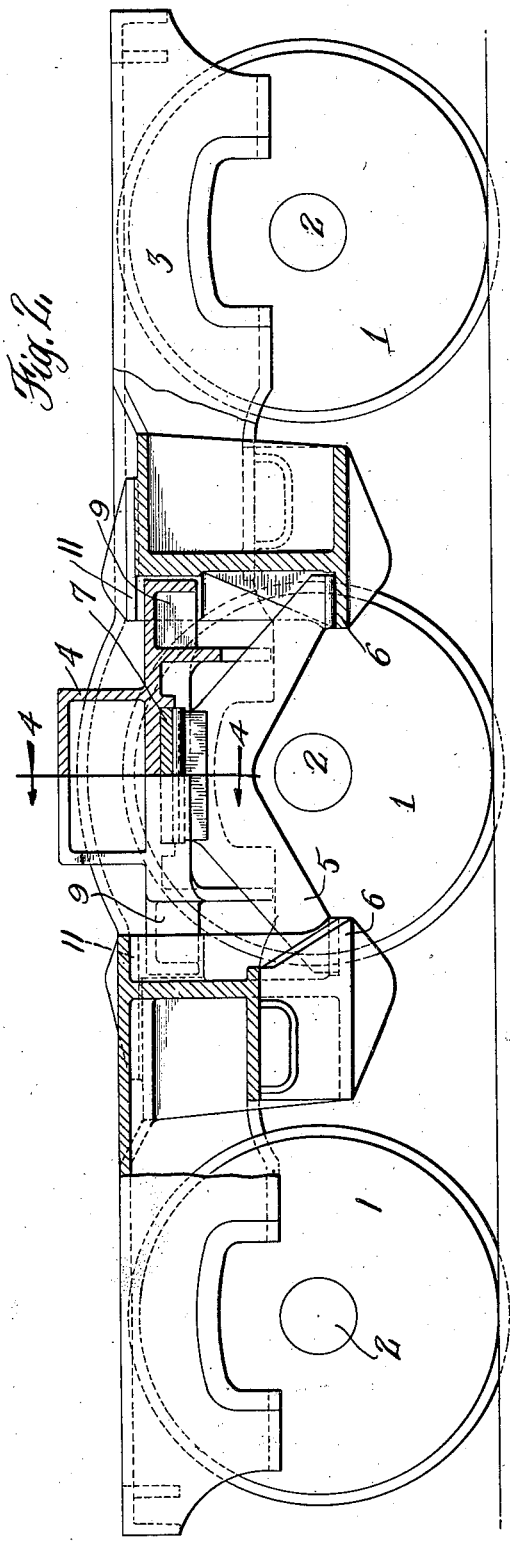
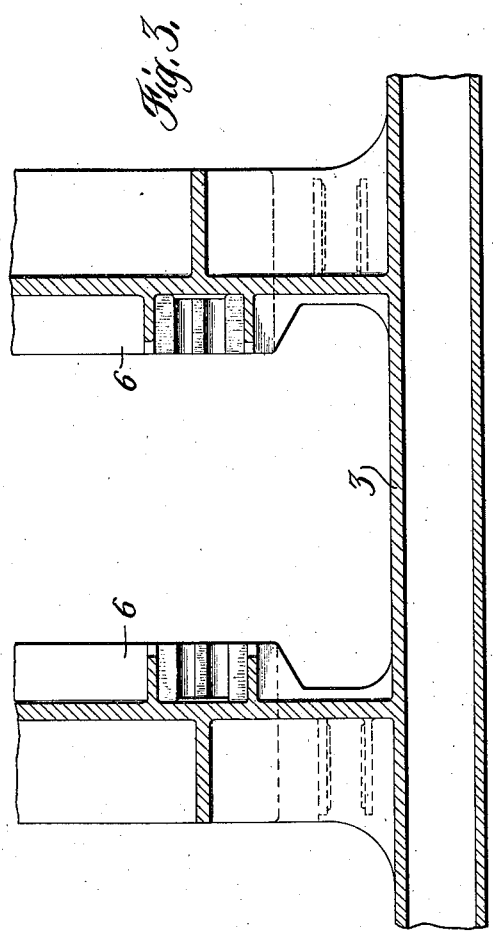
INVENTOR
William E Woodard
BY
Symmestvedt + Lechner
ATTORNEYS May 28, 1929. W. E. WOODARD 1,714,581
SIX-WHEEL TRUCK
Filed Feb. 14, 1925 3 Sheets-Sheet 3
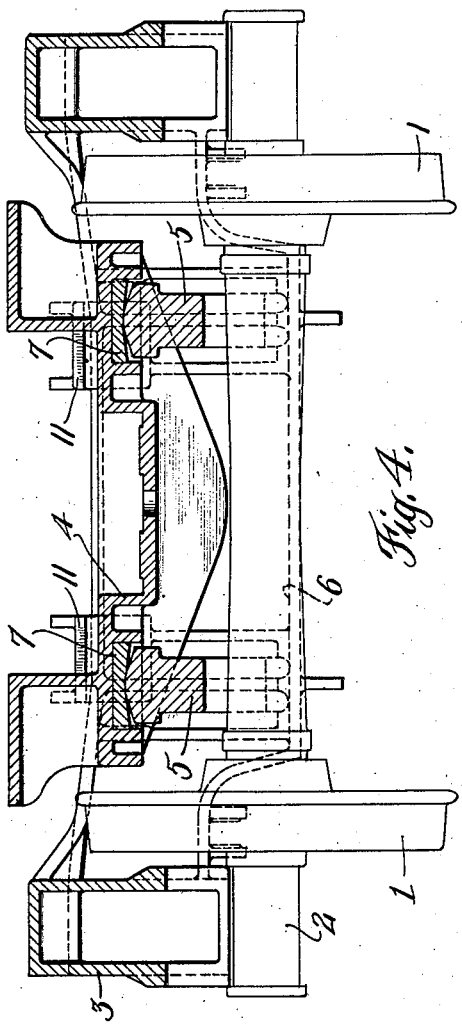
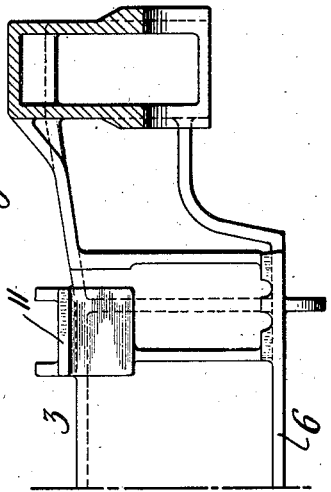
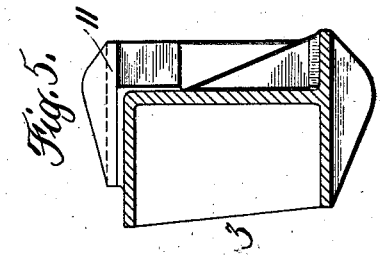

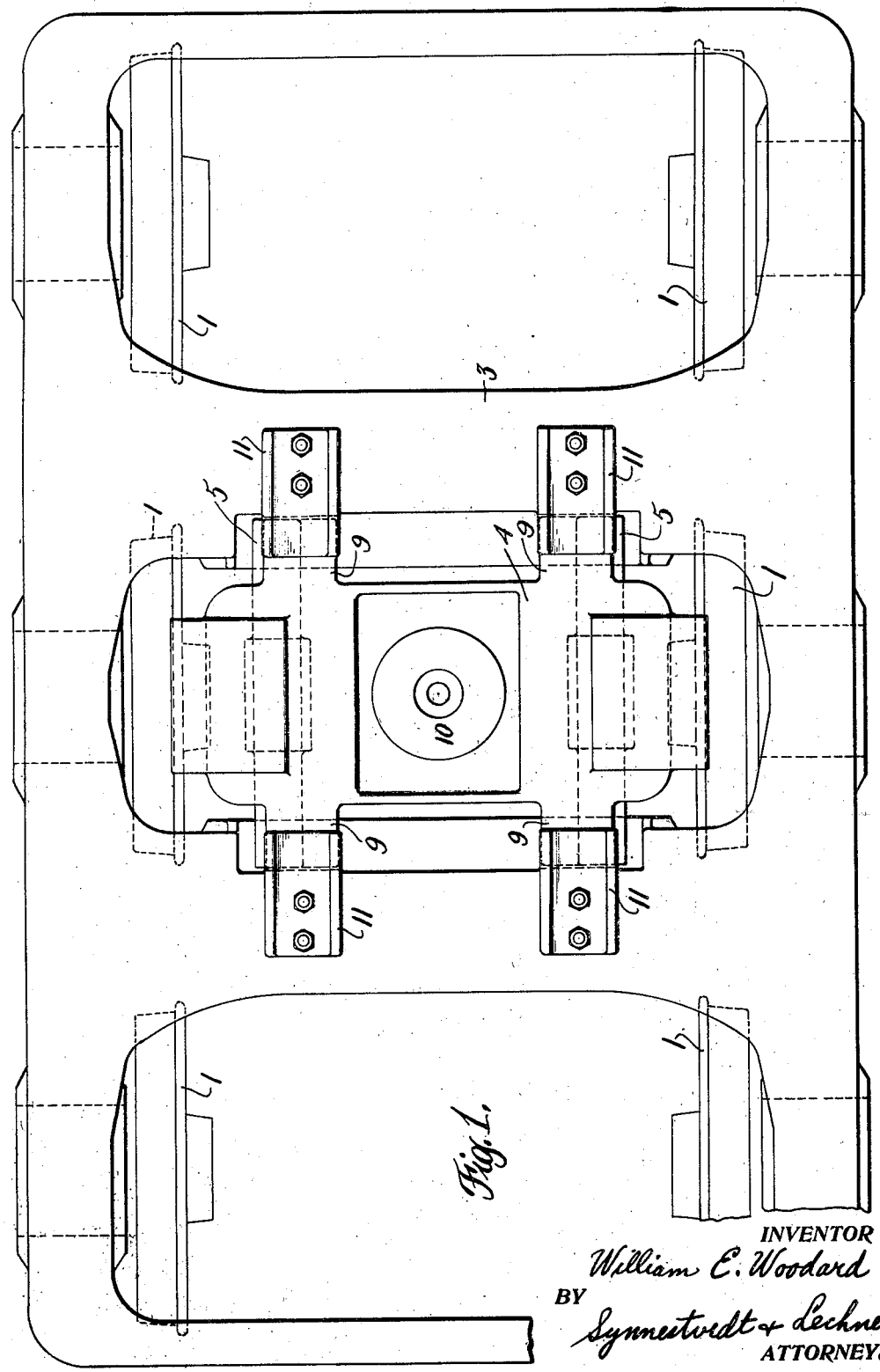

Patented May 28, 1929.

1,714,581

UNITED STATES PATENT OFFICE.

WILLIAM E. WOODARD, OF FOREST HILLS, NEW YORK.

SIX-WHEEL TRUCK.

Application filed February 14, 1925. Serial No. 9,119.

This improvement has relation to a form of truck having three axles carried in the truck frame. As usually constructed the journal boxes work in pedestals which are bolted to the truck frame and in this disclosure I have not shown the journal boxes and pedestals in the drawings because they are supposed to be those of ordinary construction.

In carrying out my improvement the truck frame may be made in one casting or if preferred it can be of a built-up structure both of which types are commonly known and applicable to my present invention. As is also the case in most standard practice the journal boxes used in association with my invention may either be equalized together or coil springs may be applied over the boxes between the box and the truck frame as preferred.

More specifically my present improvement has to do with the arrangement of the bolster which transmits load from the center pin on the car or tender frame to the truck frame, and with the means employed for centering the bolster in the truck frame. My improvement also has for a further object the construction of a modification and improvement of the truck frame itself of such character as will better cooperate with the bolster and the centering means therefor which I employ.

In most ordinary constructions of this type of truck a swinging bolster is used to transmit the weight from the car or tender frame to the truck frame, and the load is transmitted from the swinging bolster to the truck frame by means of four swinging links generally of a three-point or heart-shape type. The construction just described is well known in this art, but when used in connection with this type of truck, results in a large and complicated form of bolster casting, also requiring the construction of the cross frame members of the truck of a bifurcated form which is difficult to cast and necessarily heavy. These ordinary heart-shape or three-point hangers are attached to the truck frame with pins and also attached to the bolster with pins, which results in rapid wear and also requires very close inspection in order to see that none of the various connections are loose or parts lost which, of course, if either defect be present, will result in improper operation of the whole construction.

The first of the objects of my invention is the elimination of the difficulties referred to and others which are inherent in the use of the type of swinging bolster just described, and in order that the invention may be better understood I will now describe the same in detail in connection with the accompanying drawings in which I have illustrated the preferred form and in which Fig. 1 is a plan view of a truck embodying my improvement, Fig. 2 is an elevation partly in section showing the same truck, Fig. 3 is a partial sectional view showing certain details, Fig. 4 is a cross section through the same truck taken on the line 4—4 of Fig. 2, Fig. 5 is a sectional detail view of the frame structure employed, and Fig. 6 is another sectional view showing certain portions of the mechanism.

Referring now more particularly to Figs. 1 and 2 it will be seen that I have therein indicated three pairs of wheels 1 having axles 2 and a truck frame 3 with bearing faces at either side of each axle where the journal box pedestals are customarily attached.

The bolster 4 which I employ is a relatively small casting and rests directly upon two rockers 5 which contact with the under side of the bolster and span the middle axle of the truck and also rest upon the cross members 6 of the truck frame at the front and rear of the middle truck axle.

These rockers are in general construction of that type which has been already extensively used in engine trucks and is described in my Patent No. 1,060,222, issued April 29th, 1913, but in the application of this type of rocker to my present improvement in six-wheel truck I have very considerably modified its form as will in detail more fully appear hereinafter.

As will be seen from the drawing the rocker 5 takes the form of a truss transmitting the load from the bolster 4 to the cross members of the truck frame and thence to the side members directly in front of and behind the middle truck axle. It is found necessary in trucks of this description to provide a certain amount of lateral motion to the bolster and it is also desirable that this lateral motion be restrained by a certain amount of resistance. The type of rocker which I have illustrated in the drawing will be found to meet these conditions in the simplest possible way. As the bolster is deflected, the rockers are tilted and roll along their upper contacting surface with the result that a lateral resistance which can be accurately predetermined is offered to the motion of the bolster. The form of the rocking surface can be best seen perhaps by examination of Fig. 4.

In carrying out my invention I provide a wearing strip or plate 7 on the under side of the bolster which contacts with the upper surface of the rocker. This not only provides a renewable wearing face at this point but also ensures correct contour of the bearing attached to the bolster and the upper surface of the rocker.

It will be noticed that the bolster which I have shown has four projections 9 extending longitudinally of the truck and almost touching the cross members of the truck frame. The purpose of these projections is to transmit the longitudinal thrust of the truck center plate 10 to the cross members of the truck frame. I have also provided stops 11 over the top of the bolster which prevent the bolster being lifted out of the truck in case of derailment or in case it is found desirable to lift the entire truck by means of a chain through the hole in the center plate.

It will be seen that in this construction I have not only been able to provide a much improved form of cross member but also one which is best suited to carry the load out to the side frame of the truck. The arrangement allows a very desirable distribution of metal in the cross members and results in securing a maximum of strength with a minimum of weight.

As indicated in the drawings these cross members consist of vertical members with top and bottom lateral parts, a portion of the bottom lateral part being arranged to take the bottom rocker bearings. The cross members are also arranged so as to afford stops against the lateral motion of the bolster, to limit the motion of that part of the truck.

It will further be noticed that in carrying out my invention I have been able to space the cross members of the truck wide enough apart to allow them to pass each side of the central truck wheels which substantially facilitates construction and repair.

I claim:—

1. A truck construction having outer pairs of wheels and an intermediate pair of wheels and provided with a bolster, with cross members and with rockers straddling the middle axle and extending to the cross members and supporting the bolster above the middle axle.

2. A truck construction having outer pairs of wheels and an intermediate pair of wheels and provided with a bolster, with cross members and with rockers straddling the middle axle and extending to the cross members and supporting the bolster above the middle axle and stop means to limit the lateral motion of the bolster.

3. A truck construction having outer pairs of wheels and an intermediate pair of wheels and provided with a bolster, with cross members and with rockers extending to the cross members and supporting the bolster above the middle axle and means on the cross members to prevent the bolster lifting out of the truck frame.

4. A truck having pairs of outer wheels with axles and an intermediate pair of wheels and an axle, and cross members fixedly spaced wide enough apart to pass each side of the intermediate truck wheels, with a bolster and a single rocker at each end thereof transmitting the weight from the bolster to the cross members.

5. A truck construction having a bolster and a pair of rockers which contact with the underside of the bolster and span the middle axle of the truck and rest upon cross members of the truck frame at the front and rear of the middle truck axle.

6. A truck construction having a pair of wheels and an axle, cross members spaced wide enough apart to pass each side of the truck wheels, a bolster above said axle, and rockers supporting said bolster, spanning said axle and resting upon said cross members.

7. In a truck having an axle and wheels, a bolster, rockers supporting said bolster in position over said axle, and a frame with cross members having rocker supports and stop means preventing displacement of the bolster laterally, longitudinally, and upwardly.

In testimony whereof, I have hereunto signed my name.

WILLIAM E. WOODARD.